(12) United States Patent
Mudumbai Srinivasa et al.

(10) Patent No.: US 11,935,055 B2
(45) Date of Patent: Mar. 19, 2024

(54) WIRED MULTI-FACTOR AUTHENTICATION FOR ATMS USING AN AUTHENTICATION MEDIA

(71) Applicant: Bank of America Corporation, Charlotte, NC (US)

(72) Inventors: Srilekha Mudumbai Srinivasa, Murphy, TX (US); Brandon Sloane, Indian Land, SC (US); Jinyoung Nathan Kim, Charlotte, NC (US); Regina Yee Cadavid, San Gabriel, CA (US); Nia Mack, Prosper, TX (US); Ramkumar Korlepara, Mckinney, TX (US); Elliott Leonard Lillard, Arvada, CO (US); Philip Lone Mintac, Charlotte, NC (US); Michael Jacob Richardson, Northbrook, IL (US); Gloria Youngsook Joo, Moorpark, CA (US)

(73) Assignee: Bank of America Corporation, Charlotte, NC (US)

( * ) Notice: Subject to any disclaimer, the term of this patent is extended or adjusted under 35 U.S.C. 154(b) by 464 days.

(21) Appl. No.: 17/207,893

(22) Filed: Mar. 22, 2021

(65) Prior Publication Data
US 2022/0300979 A1 Sep. 22, 2022

(51) Int. Cl.
*G06Q 20/40* (2012.01)
*G06K 7/10* (2006.01)
(Continued)

(52) U.S. Cl.
CPC ... *G06Q 20/40145* (2013.01); *G06K 7/10782* (2013.01); *G06K 7/1417* (2013.01);
(Continued)

(58) Field of Classification Search
CPC ......... G06Q 20/40145; G06Q 20/1085; G06Q 20/204; G06Q 20/3274; G06Q 20/4012;
(Continued)

(56) References Cited

U.S. PATENT DOCUMENTS 5,053,612 A * 10/1991 Pielemeier ......... G06K 7/10722
235/482
5,386,104 A * 1/1995 Sime ....................... G06F 18/00
235/382
(Continued)

OTHER PUBLICATIONS

Mudumbai Srinivasa, S. et al., "Information Security System And Method For Multi-Factor Authentication For ATMS Using Authentication Media," U.S. Appl. No. 17/208,024, filed Mar. 22, 2021, 49 pages.

(Continued)

*Primary Examiner* — A. Hunter Wilder
*Assistant Examiner* — Joseph M Mutschler

(57) ABSTRACT

An Automated Teller Machine (ATM) terminal receives a transaction request from a user. The ATM terminal triggers a camera to capture a first image of the authentication media item presented by the user, where the first image of the authentication media item is embedded with a first unique code. The ATM terminal compares the first image of the authentication media item with a second image of the authentication media item that is associated with the user, where the second image of the authentication media item is embedded with a second unique code for verifying the user. The ATM terminal determines whether the first unique code corresponds to the second unique code. The ATM terminal conducts the transaction request if it is determined that the first unique code corresponds to the second unique code.

17 Claims, 4 Drawing Sheets

(51) Int. Cl.
*G06K 7/14* (2006.01)
*G06Q 20/10* (2012.01)
*G06Q 20/20* (2012.01)
*G06Q 20/32* (2012.01)
*G06Q 40/02* (2023.01)
*G06V 10/75* (2022.01)
*G06V 40/16* (2022.01)
*H04L 9/40* (2022.01)
*H04N 7/18* (2006.01)

(52) U.S. Cl.
CPC ....... *G06K 7/1447* (2013.01); *G06Q 20/1085* (2013.01); *G06Q 20/204* (2013.01); *G06V 10/751* (2022.01); *G06V 40/168* (2022.01); *G06V 40/172* (2022.01); *H04L 63/083* (2013.01); *H04L 63/0861* (2013.01); *H04N 7/188* (2013.01); *G06Q 20/3274* (2013.01); *G06Q 20/4012* (2013.01); *G06Q 40/02* (2013.01); *H04L 2463/082* (2013.01)

(58) Field of Classification Search
CPC .... G06Q 40/02; G06V 40/168; G06V 40/172; G06V 10/751; G06K 7/10782; G06K 7/1417; G06K 7/1447; H04L 63/083; H04L 63/0861; H04L 2463/082; H04N 7/188
See application file for complete search history.

(56) References Cited

U.S. PATENT DOCUMENTS

| | | | |
|---|---|---|---|
| 7,121,460 | B1 | 10/2006 | Parsons et al. |
| 7,350,230 | B2 | 3/2008 | Forrest |
| 7,458,507 | B2 | 12/2008 | Fillinger |
| 7,617,971 | B2 | 11/2009 | Shepley et al. |
| 7,620,041 | B2 | 11/2009 | Dunn et al. |
| 7,946,480 | B2 | 5/2011 | Miller et al. |
| 7,987,277 | B2 | 7/2011 | Endo et al. |
| 8,301,565 | B2 | 10/2012 | Cantley et al. |
| 8,332,320 | B2 | 12/2012 | Singh |
| 8,400,954 | B2 | 3/2013 | Lee |
| 8,459,546 | B1 | 6/2013 | Block et al. |
| 8,474,701 | B1 | 7/2013 | Meek et al. |
| 8,588,478 | B2 | 11/2013 | Makimoto et al. |
| 8,660,943 | B1 | 2/2014 | Chirehdast |
| 8,864,022 | B2 | 10/2014 | Hernandez |
| 8,961,619 | B2 | 2/2015 | Gum |
| 9,159,203 | B2 | 10/2015 | Priesterjahn et al. |
| 9,256,794 | B2 | 2/2016 | Braithwaite et al. |
| 9,361,619 | B2 | 6/2016 | Varadarajan et al. |
| 9,413,747 | B2 | 8/2016 | Grigg et al. |
| 9,565,186 | B1 | 2/2017 | Miller et al. |
| 9,721,248 | B2 | 8/2017 | Bondesen et al. |
| 9,836,741 | B2 | 12/2017 | Varadarajan et al. |
| 9,881,298 | B2 | 1/2018 | Flitcroft et al. |
| 10,091,195 | B2 | 10/2018 | Lindemann |
| 10,270,587 | B1 | 4/2019 | Wu |
| 10,453,062 | B2 | 10/2019 | Wolfs et al. |
| 10,504,108 | B2 | 12/2019 | Laracey |
| 10,637,853 | B2 | 4/2020 | Lindemann |
| 10,692,076 | B2 | 6/2020 | Carlson |
| 10,769,635 | B2 | 9/2020 | Lindemann |
| 10,825,003 | B2 | 11/2020 | Benkreira et al. |
| 2006/0206709 | A1 | 9/2006 | Labrou et al. |
| 2009/0024506 | A1 | 1/2009 | Houri |
| 2011/0202466 | A1 | 8/2011 | Carter |
| 2011/0309147 | A1* | 12/2011 | Barkan ............... G06K 7/10712 235/440 |
| 2014/0157393 | A1 | 6/2014 | Whitcomb |
| 2014/0289116 | A1 | 9/2014 | Polivanyi |
| 2014/0337221 | A1 | 11/2014 | Hoyos |
| 2016/0379211 | A1 | 12/2016 | Hoyos et al. |
| 2018/0075438 | A1 | 3/2018 | Iqbal et al. |
| 2018/0082304 | A1 | 3/2018 | Summerlin et al. |
| 2018/0114222 | A1 | 4/2018 | Furey et al. |
| 2018/0139608 | A1 | 5/2018 | Wilson et al. |
| 2018/0247483 | A1 | 8/2018 | Lindsay |
| 2019/0034930 | A1 | 1/2019 | Wolfs et al. |
| 2019/0043031 | A1 | 2/2019 | Wolfs et al. |
| 2019/0122034 | A1* | 4/2019 | Chen ................... G06V 40/176 |
| 2019/0253404 | A1 | 8/2019 | Briceno et al. |
| 2019/0347632 | A1 | 11/2019 | Lucas et al. |
| 2020/0051083 | A1 | 2/2020 | Kohli |
| 2020/0106771 | A1* | 4/2020 | Guibert ................ H04L 9/3247 |
| 2020/0126080 | A1 | 4/2020 | Bacastow |
| 2022/0067895 | A1* | 3/2022 | Maeda ................... G06Q 20/18 |

OTHER PUBLICATIONS

Mudumbai Srinivasa, S. et al., "Information Security System And Method For Multi-Factor Authentication For ATMS Using User Profiles," U.S. Appl. No. 17/208,253, filed Mar. 22, 2021, 49 pages.

* cited by examiner

WIRED MULTI-FACTOR AUTHENTICATION FOR ATMS USING AN AUTHENTICATION MEDIA

TECHNICAL FIELD

The present disclosure relates generally to multi-factor authentication, and more specifically to wired multi-factor authentication for ATMs using an authentication media.

BACKGROUND

In existing Automated Teller Machine (ATM) terminals, a pin number can be used to access an account of a user. However, the pin number may be compromised and an unauthorized person can use the pin number to access the account of the user. Existing ATM terminals may not have hardware and/or software capabilities to implement other authentication methods. Current information security technologies are not configured to provide multi-factor authentication for verifying users at ATM terminals.

SUMMARY

Current information security technologies are not configured to provide multi-factor authentication for verifying users at Automated Teller Machine (ATM) terminals. This disclosure contemplates various systems and methods for implementing multi-factor authentication for verifying users at ATM terminals. The corresponding description below describes various systems and methods for implementing multi-factor authentication for verifying users at ATM terminals based on verifying at least one of an authentication media item and user images.

In one embodiment, the process of implementing the multi-factor authentication may be executed by an ATM terminal. In this embodiment, the disclosed system may include an ATM terminal.

The disclosed system performs a first authentication operation based on verifying a pin number provided by the user, as described below. For example, assume that a user sends a transaction request to an ATM terminal, where the transaction request may be a request to withdraw cash, deposit cash, check an account balance, or any other service that the ATM terminal provides. The user provides a pin number to their account to the ATM terminal. The disclosed system verifies whether the provided pin number corresponds to a pin number associated with the account of the user.

The disclosed system performs a second authentication operation based on verifying an authentication media item, as described below. The authentication media item comprises at least one of a barcode, a Quick Response (QR) code, a coded image, a coded text, and the like. The authentication media item is embedded with a unique code that is a unique identifier for authenticating a user. The disclosed system receives a first image of the authentication media item when the user presents the authentication media item to the ATM terminal. For example, the user may present the authentication media item by presenting a user device (or a paper) on which the authentication media item is displayed to the ATM terminal such that a camera of the ATM terminal can capture the first authentication media image. The disclosed system scans the first authentication media image, and extracts a first unique code embedded in the first authentication media image. The disclosed system fetches a second authentication media image from a backend server, where the second authentication media image is associated with a user profile of the user. The disclosed system scans the second authentication media image, and extracts a second unique code embedded in the second authentication media image. The disclosed system determines whether the first unique code (extracted from the first authentication media image) corresponds to the second unique code (extracted from the second authentication media image). If it is determined that the first unique code corresponds to the second unique code, the disclosed system may authenticate the user.

The disclosed system may perform a third authentication operation based on verifying the identity of the user, as described below. The disclosed system receives a first image from the user captured by the camera of the ATM terminal. The disclosed system processes the first user image, and extracts a first set of features from the first user image. The first set of features may include biometric features of the user (e.g., facial features, pose estimation, etc.), among others. The disclosed system fetches a second user image from the backend server, where the second user image is associated with the user profile of the user. The disclosed system processes the second user image, and extracts a second set of features from the second user image. The disclosed system determines whether the first set of features corresponds to the second set of features. If it is determined that the first set of features corresponds to the second set of features, the disclosed system authenticates the identity of the user.

The disclosed system may perform a fourth authentication operation based on verifying historical user data stored in the user profile of the user, such as historical transaction requests, timestamps of the historical transaction requests, location coordinates of ATM terminals from which the historical transaction requests were made, among others. For example, the disclosed system may determine whether a timestamp at which the user makes the transaction request correlates or is with a time range of the timestamps of historical transaction requests. For example, assume that timestamps of the historical transaction requests indicate a particular time range, for example, 9 am to 12 pm on Fridays. Also, assume that the user makes a transaction request at the ATM terminal at 10 am on Friday. In this example, the disclosed system determines that the timestamp of the transaction request correlates with the timestamps of the historical transaction requests. The disclosed system may use any combination of the first to the fourth authentication operations for verifying the user at the ATM terminal. If the disclosed system verifies the user by implementing the multi-factor authentication described above, the disclosed system conducts the transaction request of the user.

The disclosed system is configured such that minimal (or no) modifications are made to existing ATM terminals. For example, the disclosed system facilitates the reception of the authentication media item at the ATM terminal by using a beam splitter. The beam splitter comprises an optical device that is configured to direct beams of light reflected from the authentication media item presented to the ATM terminal (displayed on a user device or a paper) to the camera even if the authentication media item is not within a field of view of the camera. As such, the multi-factor authentication described above can be implemented in existing ATM terminals that may not have hardware and/or software capabilities to electrically or wirelessly communicate with user devices (e.g., mobile phones, smartphones, smartwatches, etc.) to receive the authentication media item.

With respect to an ATM terminal verifying a user based on verifying an authentication media item, in one embodiment, the ATM terminal comprises a memory, a camera, and a processor. The memory is operable to store a first image of an authentication media item associated with the user. The authentication media item comprises at least one of a barcode and a QR code. The unique code is a unique identifier used for authenticating the user. The camera is operably coupled with the memory. The camera is configured to capture a second image of the authentication media item when the authentication media item is presented to the ATM. The processor is operably coupled with the memory and the camera. The processor receives a transaction request. In response to receiving the transaction request, the processor verifies the user by performing a first authentication operation. In the first authentication operation, the processor triggers the camera to capture the second image of the authentication media item. The processor receives the second image of the authentication media item from the camera. The processor compares the first image of the authentication media item with the second image of the authentication media item. The processor determines whether the first image of the authentication media item corresponds to the second image of the authentication media item. In response to determining that the first image of the authentication media item corresponds to the second image of the authentication media item, the processor conducts the transaction request.

In one embodiment, the process of implementing the multi-factor authentication may be executed by a backend server that is configured to oversee operations of one or more ATM terminals. In this embodiment, the disclosed system may include a server and an ATM terminal.

The disclosed system may perform one or more of the authentication operations described above at the server. For example, the disclosed system may verify the user based on verifying an authentication media item. In another example, the disclosed system may verify the identity of the user using user images. In another example, the disclosed system may verify the user based on verifying historical transaction requests previously made by the user.

With respect to a server verifying a user using an authentication media item, in one embodiment, a system comprises an ATM terminal and a server. The ATM terminal is configured to perform a task that comprises at least one of withdraw cash, deposit cash, and check an account balance. The server is operably coupled with the ATM terminal. The server comprises a memory and a processor. The memory is operable to store a user profile associated with a user, the user profile comprises a first image of an authentication media item associated with the user. The authentication media item comprises at least one of a barcode and a Quick Response (QR) code. The authentication media item is associated with a unique code. The unique code is a unique identifier used for authenticating the user. The processor is operably coupled with the memory. The processor receives, from the ATM, a request to verify the identity of the user when the ATM receives a transaction request to perform the task. In response to receiving the request from the ATM, the processor performs a first authentication operation. In this process, the processor communicates the authentication media item to a user device associated with the user. The processor receives, from the ATM, a second image of the authentication media item when the authentication media item is presented to the ATM. The processor compares the second image of the authentication media item with the first image of the authentication media item. The processor determines whether the first image of the authentication media item corresponds to the second image of the authentication media item. In response to determining that the first image of the authentication media item corresponds to the second image of the authentication media item, the processor approves the transaction request.

With respect to a server verifying a user using user images, in one embodiment, a system comprises an ATM terminal and a server. The ATM terminal is configured to perform a task that comprises at least one of withdraw cash, deposit cash, and check an account balance. The ATM terminal comprises a camera configured to capture one or more images of the user operating the ATM. The server is operably coupled to the ATM terminal. The server comprises a memory and a processor. The memory is operable to store a user profile associated with the user, the user profile comprises a first image of the user. The processor is operably coupled with the memory. The processor receives, from the ATM, a request to verify the identity of the user when the ATM receives a transaction request to perform the task. In response to receiving the request from the ATM, the processor performs a first authentication operation to verify the identity of the user. In this operation, the processor triggers the camera associated with the ATM to capture a second image of the user. The processor receives, from the ATM, the second image of the user. The processor compares the second image of the user with the first image of the user. The processor determines whether the first image of the user corresponds to the second image of the user. In response to determining that the first image of the user corresponds to the second image of the user, the processor approves the transaction request.

The disclosed systems provide several practical applications and technical advantages which include: 1) technology that utilizes an authentication media item for verifying a user at an ATM terminal, where the authentication media item comprises at least one of a barcode, a QR code, a coded image, a coded text, and the like; 2) technology that verifies the identity of the user at the ATM terminal based on features extracted from user images, where the features include accessories features, biometric features, among others; 3) technology that verifies the user by comparing the transaction request with information stored in a user profile, such as timestamps of historical transaction requests, location coordinates of ATM terminals from which the historical transaction requests were made; 4) technology that implements multi-factor authentication using ATM terminals that may not have hardware and/or software capabilities to electrically or wirelessly communicate with user devices to receive the authentication media item, for example, by using a beam splitter, similar to that described above; and 5) technology that implements multi-factor authentication using user devices that may not have hardware and/or software capabilities to electrically or wirelessly communicate with ATM terminals for sending the authentication media item.

As such, the systems described in this disclosure may improve the information security and multi-factor authentication technologies by utilizing one or more of 1) an authentication media item that is encoded or embedded with a code to uniquely identify a user, 2) features (e.g., biometric features, associates features) extracted from an image of the user, and 3) historical transaction requests of the user. The disclosed system may be integrated into a practical application of securing the account of the user from being accessed from ATM terminals. The disclosed system may further be integrated into an additional practical application of improving underlying operations of ATM terminals by allowing authorized users to access their accounts from ATM terminals, thus, unauthorized access to the ATM terminals and user accounts may be minimized or prevented. The disclosed system may also or alternatively reduce or eliminate practical and technical barriers for implementing multi-factor authentications at existing ATM terminals by utilizing components of the existing ATM terminals that may not have hardware and/or software capabilities to electrically or wirelessly communicate with user devices to receive authentication media items.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
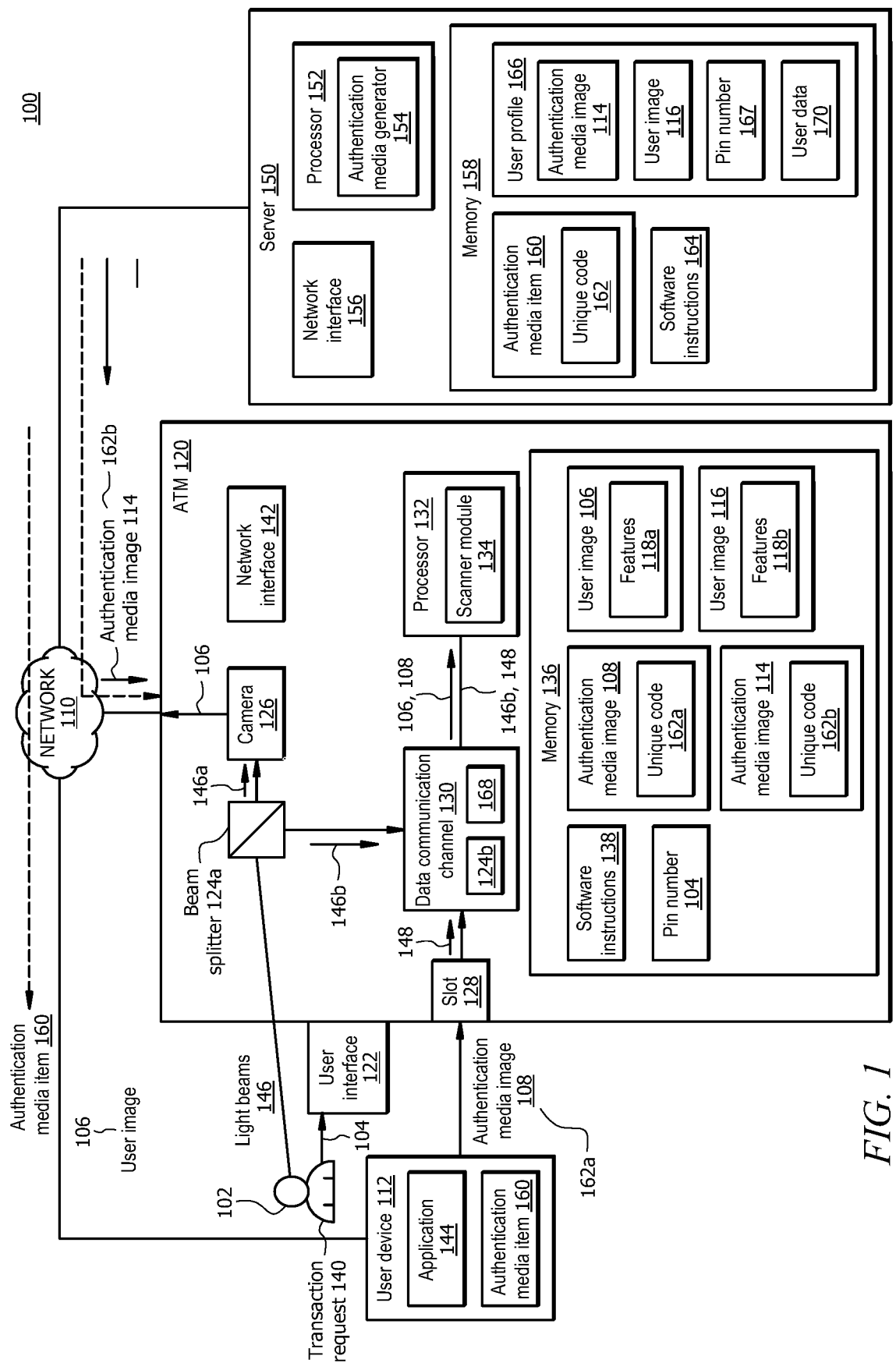
FIG. 1 illustrates an embodiment of a system configured to implement multi-factor authentication for authenticating users at ATM terminals.

As described above, previous technologies fail to provide efficient, reliable, and safe solutions for implementing multi-factor authentication for authenticating user at ATM terminals. This disclosure provides various systems and methods for implementing multi-factor authentication for authenticating user at ATM terminals. In one embodiment, a system 100 and a method 200 for verifying a user at an ATM terminal using an authentication media item are described in FIGS. 1 and 2, respectively. In one embodiment, system 100 and method 300 for verifying a user at an ATM terminal from a server are described in FIGS. 1 and 3, respectively. In one embodiment, system 100 and method 400 for verifying a user at an ATM terminal using user images are described in FIGS. 1 and 4, respectively.
Example System for Implementing Multi-Factor Authentication for Authenticating Users at ATM Terminals FIG. 1 illustrates one embodiment of a system 100 that is configured to implement multi-factor authentication for authenticating users 102 at ATM terminals 120. In one embodiment, system 100 comprises an ATM terminal 120. In some embodiments, system 100 further comprises a user device 112, a server 150, and a network 110 that enables communications among components of the system 100. The ATM terminal 120 comprises a processor 132 in signal communication with a memory 136. Memory 136 stores software instructions 138 that when executed by the processor 132 cause the processor 132 to perform one or more functions described herein. For example, when the software instructions 138 are executed, the processor 132 executes a scanner module 134 to verify the user 102 by authenticating 1) an authentication media item 160 that the user 102 presents to the ATM terminal 120 and 2) the identity of the user 102 based on extracting features from an image of the user 102.

Server 150 comprises a processor 152 in signal communication with a memory 158. Memory 2 comprises software instructions 164 that when executed by the processor 152 cause the processor 152 to perform one or more functions described herein. For example, when the software instructions 164 are executed, the processor 152 executes an authentication media generator 154 to generate the authentication media item 160. In other embodiments, system 100 may not have all of the components listed and/or may have other elements instead of, or in addition to, those listed above.

In general, system 100 (at an ATM terminal 120) receives a transaction request 140 from a user 102 operating a user interface 122 associated with the ATM terminal 120. In response, system 100 verifies the user 102 by performing a first authentication operation. For example, the first authentication operation may include verifying a pin number 104 that the user 102 provides to the ATM terminal 120 using the user interface 122. The system 100 further verifies the user 102 by performing a second authentication operation. For example, the second authentication operation may include verifying an authentication media item 160 that the user 102 presents to the ATM terminal 120. The authentication media item 160 comprises at least one of a barcode, a QR code, a coded image, a coded text, and the like. The authentication media item 160 is associated with a unique code 162 that is a unique identifier used for authenticating the user 102 (and other users 102 associated with a user profile 166 that belongs to the user 102). In the second authentication operation, the ATM terminal 120 triggers a data communication channel 130 to capture a first image 108 from the authentication media item 160. For example, the data communication channel 130 may comprise one or more lenses, a beam splitter 124b and a camera 168 that are operably coupled with each other. The data communication channel 130 communicates the first authentication media image 108 to the scanner module 134 for evaluation. The scanner module 134 scans the first authentication media image 108, and extracts a unique code 162a embedded in the first authentication media image 108. The scanner module 134 compares the extracted unique code 162a with a unique code 162b embedded in a second image 114 from the authentication media item 160 which is communicated from the server 150. In other words, the scanner module 134 compares the first authentication media image 108 with the second authentication media image 114. The scanner module 134 determines whether the first authentication media image 108 corresponds to the second authentication media image 114, i.e., whether the unique code 162a corresponds to the unique code 162b. If it is determined that the unique code 162a corresponds to the unique code 162b, the scanner module 134 authenticates the authentication media item 160 that the user 102 presented to the ATM terminal 120, i.e., determines that the second authentication operation is successful. In response, the system 100 may conduct the transaction request 140. Otherwise, the system 100 may deny the transaction request 140.

The system 100 may further verify the user by performing a third authentication operation. For example, the third authentication operation may include verifying the identity of the user 102. In the third authentication operation, the ATM terminal 120 triggers the data communication channel 130 to capture a first image 106 from the user 102. The data communication channel 130 communicates the first user image 106 to the scanner module 134 for evaluation. The scanner module 134 processes the first user image 106, and extracts features 118a from the first user image 106. The scanner module 134 also processes a second user image 116 communicated from the server 150, and extracts its features 118b. For example, the scanner module 134 (or the processor 132) may fetch the second user image 116 from the user profile 166 associated with the user 102. The scanner module 134 compares the first user image 106 with the second user image 116. In this operation, the scanner module 134 compares the features 118a extracted from the first user image 106 with features 118b extracted from the second user image 116. The scanner module 134 determines whether the first user image 106 corresponds to the second user image 116, i.e., whether the features 118a correspond to the features 118b. If it is determined that the first user image 106 corresponds to the second user image 116, the scanner module 134 authenticates the identity of the user 102, and determines that the third authentication operation is successful.

System Components

Network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

User device 112 is generally any device that is configured to process data and interact with users 102. Examples of user device 112 include, but are not limited to, a cell phone, a mobile phone, a smartphone, a smartwatch, an electronic tablet device, or may other portable consumer electronics device. For example, assume that the user 102 wants to perform a transaction or access their account from the ATM terminal 120. For authenticating the user 102, the user device 112 may receive the authentication media item 160 from the server 150 that is associated with an organization at which the user 102 has an account.

The user device 112 may receive the authentication media item 160 using any appropriate method. In one example, the user device 112 may receive the authentication media item 160 via an application 144 that is communicatively coupled with the server 150. The application 144 may be a software/mobile/web application associated with the server 150. In another example, the user device 112 may receive the authentication media item 160 in a text message, an image message, and the like.

ATM Terminal

ATM terminal 120 is generally any automated dispensing device configured to dispense items when users interact with the ATM terminal 120. For example, the ATM terminal 120 may comprise a terminal device for dispensing cash, tickets, scrip, travelers' checks, airline tickets, other items of value, etc. In one embodiment, ATM terminal 120 is an automated teller machine that allows users 102 to withdraw cash, check balances, make deposits interactively using, for example, a magnetically encoded card, a check, etc., among other services that the ATM terminal provides.

In the illustrated embodiment, the ATM terminal 120 comprises user interfaces 122, a beam splitter 124, a camera 126, a slot 128, a data communication channel 130, a processor 132, and a memory 136. In other embodiments, the ATM terminal 120 may not have all of the components listed and/or may have other elements instead of, or in addition to, those listed above.

User interfaces 122 generally comprises any user interface that a user 102 can use to interact with the ATM terminal 120. For example, the user interfaces 122 may include a keypad (comprising button keys), a display (programmed to display button keys, menus, text messages, etc.), and the like.

Beam splitter 124 (e.g., each of beam splitters 124a and 124b) generally comprises an optical device that is configured to split incoming beams of light, and change directions of the incoming beams of light to a specific direction or an angle (e.g., 45 degrees, 50 degrees, etc.) with respect to the angle of the incoming beams of light. In one example, the beam splitter 124 may comprise one or more glass prisms that are arranged to direct the incoming beams of light in a specific direction. In another example, the beam splitter 124 may comprise one or more reflective lenses that are arranged to direct the incoming beams of light in a specific direction. In another example, the beam splitter 124 may comprise any optical device that is configured to change a direction of an incoming beam of light to a specific direction, such as liquid crystal arrays, a transparent substrate (e.g., glass, plastic, etc.) coated with a thin-film aluminum, silver, etc., among others. The components of the beam splitter 124 may have any geometrical shape, such as a cube, triangle prism, etc.

The beam splitter 124a is operably coupled with the camera 126 and data communication channel 130. The beam splitter 124a is configured to capture beams of light 146 reflected or bounced off from objects to the camera 126 and/or data communication channel 130. The beam splitter 124a is positioned at an angle with respect to the camera 126 such that the camera 126 is enabled to receive beams of light 146 reflected from an object even if the object is not within the field of view of the camera 126. In one example, assume that the camera 126 is configured to observe the environment in front of the ATM terminal 120, i.e., the camera 126 is facing toward the user 102. The beam splitter 124a splits the beams of lights 146 reflected from the user 102 between the camera 126 and the data communication channel 130. For example, the beam splitter 124a directs the light beams 146a to the camera 126, and light beams 146b to the data communication channel 130. For example, the beam splitter 124a may direct a first percentage of the light beams 146 (e.g., 40%, 50%, 60%, etc.) to the camera 126, and a second percentage of the light beams 146 (e.g., 60%, 50%, 40%, etc.) to the data communication channel 130.

Camera 126 may generally be any camera that is configured to capture images and/or videos within its corresponding field of view. In the illustrated embodiment, the camera 126 may be an existing camera 126 that is already installed in the ATM terminal 120. In an alternative embodiment, the camera 126 may be added to the ATM terminal 120.

In one embodiment, the camera 126 may capture a stream of user images 106 through the beam splitter 124. For example, from the light beams 146a, the camera 126 captures a stream of user images 106. The camera 126 may transmit the stream of the user images 106 to the server 150. The steam of user image 106 may be used as an additional user data for authenticating the user 102. For example, the stream of user image feed 106 may be archived and used for determining the identity of the user 102.

Data communication channel 130 is generally any component that can communicate data to the scanner module 134. In one embodiment, the data communication channel 130 may comprise one or more lenses, a beam splitter 124*b* and/or a camera 168 to capture the user images 106 and authentication media image 108, and communicate them to the scanner module 134. For example, the beam splitter 124*b* may receive the light beams 146*b* and direct them to the camera 168 to capture one or more user images 106. In another example, the beam splitter 124*b* may receive the light beams 148 and direct them to the camera 168 to capture one or more authentication media images 108. The data communication channel 130 communicates the user images 106 and authentication media images 108 to the scanner module 134 for performing multi-factor authentication operations. This process is described in detail further below in conjunction with an operational flow of the system 100. In an alternative embodiment, the data communication channel 130 may comprise a periscope camera to transfer or focus images (e.g., user images 106 and/or authentication media images 108) to a spot where the scanner module 134 scans images. The periscope camera may comprise one or more prisms and lenses that are arranged in such a way to focus images to a spot where the scanner module 134 scans images. for example, the spot where the scanner module 134 scans images may a scanner medium formed by glass alloy materials, plastic alloy materials, paper, or any substrate that can be used to focus images on.

Processor 132 comprises one or more processors operably coupled to the memory 136. The processor 132 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 132 may be a programmable logic device, a microcontroller, a microprocessor, or any suitable combination of the preceding. The one or more processors are configured to process data and may be implemented in hardware or software. For example, the processor 132 may be 8-bit, 16-bit, 32-bit, 64-bit, or of any other suitable architecture. The processor 132 may include an arithmetic logic unit (ALU) for performing arithmetic and logic operations, processor 132 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 138) to implement the scanner module 134. In this way, processor 132 may be a special-purpose computer designed to implement the functions disclosed herein. In an embodiment, the processor 132 is implemented using logic units, FPGAs, ASICs, DSPs, or any other suitable hardware. The processor 132 is configured to operate as described in FIGS. 1-4. For example, the processor 132 may be configured to perform one or more steps of method 200 as described in FIG. 2.

Memory 136 may be volatile or non-volatile and may comprise a read-only memory (ROM), random-access memory (RAM), ternary content-addressable memory (TCAM), dynamic random-access memory (DRAM), and static random-access memory (SRAM). Memory 136 may be implemented using one or more disks, tape drives, solid-state drives, and/or the like. Memory 136 is operable to store software instructions 138, pin number 104, authentication media images 108 and 114, user images 106 and 116, and/or any other data or instructions. The software instructions 138 may comprise any suitable set of instructions, logic, rules, or code operable to execute the processor 132.

Network interface 142 is configured to enable wired and/or wireless communications (e.g., via network 110). The network interface 142 is configured to communicate data between the ATM terminal 120 and other devices (e.g., user devices 112, servers 150), databases, systems, or domains. For example, the network interface 142 may comprise a WIFI interface, a local area network (LAN) interface, a wide area network (WAN) interface, a modem, a switch, or a router. The processor 132 is configured to send and receive data using the network interface 142. The network interface 142 may be configured to use any suitable type of communication protocol as would be appreciated by one of ordinary skill in the art.

Scanner Module

Scanner module 134 may be implemented by the processor 132 executing software instructions 138, and is generally configured to 1) scan an authentication media image 108 and extract a unique code 162*a* embedded in it, and 2) scan a user image 106 and extract its features 118*a*. Similarly, the scanner module 134 may be configured to 1) scan an authentication media image 114 and extract a unique code 162*b* embedded in it, and 2) scan a user image 116 and extract its features 118*b*.

In one embodiment, the scanner module 134 may comprise a barcode scanner, a QR code scanner, or any other suitable type of scanner that can extract an electronic code 162 embedded in the authentication media item 160. For example, the scanner module 134 may use an Optical Character Recognition (OCR) algorithm for extracting the unique code 162 from authentication media images 108 and 114. The scanner module 134 uses the extracted unique code 162 to perform an authentication operation and verify the user 102. This process is described further below in conjunction with an operational flow of the system 100.

In one embodiment, the scanner module 134 may be implemented by a machine learning algorithm, including an image processing algorithm, facial recognition algorithm, pose estimation algorithm, and the like to extract features from user images 106. The scanner module 134 uses the extracted features to perform another authentication operation and verify the identity of the user 102. This process is described further below in conjunction with the operational flow of the system 100.

Server

Server 150 is generally a server or any other device configured to process data and communicate with computing devices (e.g., user devices 112, ATM terminals 120), databases, etc. via the network 110. In one example, server 150 may be a backend server 150 associated with the ATM terminal 120. The server 150 is generally configured to oversee operations of the ATM terminal 120 as described further below.

Processor 152 comprises one or more processors operably coupled to the memory 158. The processor 152 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 152 may be a programmable logic device, a microcontroller, a microprocessor, or any suitable combination of the preceding. The one or more processors are configured to process data and may be implemented in hardware or software. For example, the processor 152 may be 8-bit, 16-bit, 32-bit, 64-bit, or of any other suitable architecture. The processor 152 may include an arithmetic logic unit (ALU) for performing arithmetic and logic operations, processor 152 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 164) to implement the authentication media generator 154. In this way, processor 152 may be a special-purpose computer designed to implement the functions disclosed herein. In an embodiment, the processor 152 is implemented using logic units, FPGAs, ASICs, DSPs, or any other suitable hardware. The processor 152 is configured to operate as described in FIGS. 1-4. For example, the processor 152 may be configured to perform one or more steps of methods 200, 300, and 400 as described in FIGS. 2, 3, and 4, respectively.

Network interface 156 is configured to enable wired and/or wireless communications (e.g., via network 110). The network interface 156 is configured to communicate data between the server 150 and other devices (e.g., user devices 112, ATM terminals 120), databases, systems, or domains. For example, the network interface 156 may comprise a WIFI interface, a local area network (LAN) interface, a wide area network (WAN) interface, a modem, a switch, or a router. The processor 152 is configured to send and receive data using the network interface 156. The network interface 156 may be configured to use any suitable type of communication protocol as would be appreciated by one of ordinary skill in the art.

Memory 158 may be volatile or non-volatile and may comprise a read-only memory (ROM), random-access memory (RAM), ternary content-addressable memory (TCAM), dynamic random-access memory (DRAM), and static random-access memory (SRAM). Memory 158 may be implemented using one or more disks, tape drives, solid-state drives, and/or the like. Memory 158 is operable to store the authentication media item 160, software instructions 164, user profile 166, and/or any other data or instructions. The software instructions 164 may comprise any suitable set of instructions, logic, rules, or code operable to execute the processor 152.

Authentication Media Generator

Authentication media generator 154 may be implemented by the processor 152 executing the software instructions 164, and is generally configured to generate an authentication media item 160 embedded with a unique code 162. In other words, the authentication media generator 154 encodes the unique code 162 into the authentication media item 160. The unique code 162 may include numeric, alphanumeric, byte, binary, or any other data format. In one embodiment, the authentication media generator 154 may encode the unique code 162 into the authentication media item 160 by implementing a data encoding algorithm, a data encryption algorithm, and the like. The generated authentication media item 160 may be presented in a two-dimensional image, a barcode, a QR code, and the like. The authentication media generator 154 communicates the authentication media item 160 and/or any information stored in the user profile 166 to the ATM terminal 120 upon detecting a transaction request 140 from the user 102 at the ATM terminal 120.

In one example, the user profile 166 may be associated with the user 102. In another example, the user profile 166 may be associated with two or more users 102 that share a financial account. For example, the user profile 166 may be associated with members of a family (or a company). As such, any member of the family (or a company) associated with the user profile 166 may be referred to as a user 102. The user profile 166 may store a pin number 167 to the account of the user(s) 102, one or more images 116 of the user(s) 102, an authentication media item image 114, and user data 170. The user data 170 may include historical transaction requests 140, timestamps of the historical transaction requests 140, location coordinates of ATM terminals 120 from which the historical transaction requests 140 have been recorded, etc. The information stored in the user profile 166 may be used for performing another authentication operation for verifying the user 102. This process is described further below in conjunction with an operational flow of the system 100.

Operational Flow

The corresponding description below describes multi-factor authentication operations, including 1) an authentication operation based verifying the pin number 104, 2) an authentication operation based on verifying the authentication media item 160, 3) an authentication operation based on verifying the identity of the user 102 based on processing user images 108, and 4) an authentication operation based on verifying user data 170.

For example, assume that the user 102 wants to perform a transaction at the ATM terminal 120, such as withdraw cash, deposit cash, check an account balance, or any other service that the ATM terminal 120 provides. The user 102 provides a pin number 104 to their account using the user interface 122. The processor 132 receives the pin number 104 and determines whether the provided pin number 104 corresponds to a pin number 167 that is associated with the account and the user profile 166 of the user 102. This process may be referred to as a first authentication operation to verify the user 102. For example, assume that the processor 132 determines that the provided pin number 104 corresponds to the pin number 167. In response, the processor 132 performs a second authentication operation to verify the user 102 described below.

Performing an Authentication Operation Based on the Authentication Media Item

In the second authentication operation, the processor 132 triggers the data communication channel 130 to capture light beams 148 when the user 102 presents the authentication media item 160 to the ATM terminal 120. In this process, the processor 132 may trigger the camera 168 to capture an authentication media item image 108 when the user 102 presents the authentication media item 160 to the ATM terminal 120. In one example, the user 102 may present the authentication media item 160 to the ATM terminal 120 by inserting the authentication media item 160 (displayed on a screen of the user device 112 or a paper) into the slot 128. In another example, the user 102 may present the authentication media item 160 to the ATM terminal 120 by bringing the authentication media item 160 (displayed on a screen of the user device 112 or a paper) in the field of view of the camera 126 (e.g., in front of the camera 126). As such, a digital and/or a physical image of the authentication media item 160 may be presented to the ATM terminal 120. For example, when the user 102 inserts the authentication media item 160 into the slot 128, the data communication channel 130 directs beams of light 148 reflected from the authentication media item 160 to the camera 168. From the light beams 148, the camera 168 captures a first authentication media image 108. As such, the second camera 168 can capture the first authentication media image 108 even though the authentication media item 160 is not within the field-of-view of the second camera 168. The second camera 168 communicates the first authentication media image 108 to the scanner module 134 for processing. In another example, the data communication channel 130 (using a periscope camera) may receive the light beams 148 and focus them to a spot where the scanner module 134 can scan objects or images of objects. The scanner module 134 processes the light beams 148 and generates the authentication media image 108, for example, by using charge-coupled device sensors and/or the like. The scanner module 134 scans the first authentication media image 108, and extracts the unique code 162a embedded in the first authentication media image 108. The scanner module 134 may also scan a second authentication media image 114 that is communicated from the server 150, and extracts the unique code 162b from the second authentication media image 114. The scanner module 134 (or the processor 132) may fetch the second authentication media image 114 from the user profile 166 stored at the server 150.

The scanner module 134 compares the unique code 162a (extracted from the first authentication media image 108) with the unique code 162b (second authentication media image 114). The scanner module 134 determines whether the unique code 162a corresponds to the unique code 162b. If it is determined that the unique code 162a corresponds to the unique code 162b, the scanner module 134 determines that the second authentication operation is successful. Thus, in one embodiment, the scanner module 134 may conduct the transaction request 140. Otherwise, the scanner module 134 may deny the transaction request 140. The scanner module 134 may perform another authentication operation for verifying the identity of the user 102 from user images 106, as described below.

Performing an Authentication Operation using User Images

In this process, the processor 132 triggers the beam splitter 124a to direct the light beams 146b reflected from the user 102 to the data communication channel 130. For example, using a motion sensor, the processor 132 may detect the presence of the user 102 at the ATM 120. In response, the processor 132 triggers the beam splitter 124a to direct the light beams 146b to the data communication channel 130. In another example, in response to verifying the pin number 104 (whether or not the pin number 104 is provided correctly), the processor 132 may trigger the beam splitter 124a to direct the light beams 146b to the data communication channel 130. In one example, the data communication channel 130 (using the beam splitter 124b and camera 168) may capture the first user image 106, and communicate the first user image 106 to the scanner module 134 for processing. As such, the camera 168 can capture the first user image 106 even though the user 102 is not within the field-of-view of the camera 168.

In another example, the data communication channel 130 (using the beam splitter 124b) may focus the light beams 146b to a spot where the scanner module 134 can scan objects or images of objects. The scanner module 134 processes the light beams 146b and generates the first user image 106, for example, by using charge-coupled device sensors and/or the like. The scanner module 134 scans the first user image 106, and extracts features 118a from the first user image 106, e.g., using machine learning image processing techniques, facial recognitions, pose estimation techniques, and the like. The features 118a may include biometric features of the user 102 (e.g., facial features, pose estimations, etc.), among others. The features 118a may be represented by a vector of numerical values describing the features 118a.

The scanner module 134 may also scan a second user image 116 that is communicated from the server 150, and extracts features 118b from the second user image 116, similar to that described above with respect to the first user image 106. The features 118b may be represented by a vector of numerical values describing the features 118b. The scanner module 134 (or the processor 132) may fetch the second user image 116 from the user profile 166 stored at the server 150.

The scanner module 134 compares the features 118a extracted from the first user image 106 with the features 118b extracted from the second user image 116. The scanner module 134 determines whether the features 118a correspond to the features 118b. For example, the scanner module 134 may determine that the features 118a correspond to the features 118b, if above a threshold percentage (e.g., above 70%, above 80%, etc.) of the numerical values of the features 118a correspond to their corresponding numerical values from the features 118b. In another example, the scanner module 134 may determine that the features 118a correspond to the features 118b, if above a threshold percentage (e.g., above 70%, above 80%, etc.) of the numerical values of the features 118a are within a threshold range (e.g., ±5%, ±7%, etc.) from their corresponding numerical values of the features 118b. If it is determined that the features 118a correspond to the features 118b, the scanner module 134 verifies the identity of the user 102, and authenticates the user 102. Thus, the scanner module 134 may conduct the transaction request 140. Otherwise, the scanner module 134 may deny the transaction request 140.

Performing an Authentication Operation Based on Verifying User Data

The information stored in the user profile 166 may be used for verifying the user 102. For example, assume that user data 170 includes timestamps of the historical transaction requests 140 that indicate a particular time range, for example, 9 am to 12 pm on Fridays. Also, assume that the user 102 makes a transaction request 140 at the ATM terminal 120, and provides a pin number 104 to the ATM terminal 120 at a first timestamp on a particular day of a week (e.g., 10 am on Friday). Upon verifying the pin number 104 provided by the user 102, system 100 (e.g., via the processor 152 and/or processor 132) may determine whether the first timestamp correlates with or is within the particular time range of the historical transaction requests 140. If it is determined that the first timestamp correlates with the particular time range of the historical transaction requests 140, the system 100 may verify that the user 102 may access the account of the user 102. As such, the system 100 may use the timestamps of the historical transaction requests 140 as another authentication operation for verifying the user 102.

In another example, assume that user data 170 includes one or more particular location coordinates of ATM terminals 120 from which the historical transaction requests 140 have been recorded. Also, assume that the user 102 makes a transaction request 140 at the ATM terminal 120 that is located at a first location coordinate, and provides a pin number 104 to the ATM terminal 120. Upon verifying the pin number 104 provided by the user 102, system 100 (e.g., via the processor 152 and/or processor 132) may determine whether the first location coordinate of the transaction request 140 is among the one or more particular location coordinates of ATM terminals 120 recorded in the user data 170. If it is determined that the first location coordinate of the transaction request 140 is among the one or more particular location coordinates of historical transaction requests 140 recorded in the user data 170, the system 100 may verify that the user 102 may access the account of the user 102. As such, the system 100 may use the location coordinates of the historical transaction requests 140 as another authentication operation for verifying the user 102.

In one embodiment, the system 100 may be configured to perform the authentication operation using the authentication media images 108 and user images 106 in parallel. For example, the processor 132 may trigger the beam splitter 124a to direct the light beams 146b (reflected from the user 102) to the data communication channel 130, and trigger the data communication channel 130 to receive the light beams 148 (reflected from the authentication media item 160 inserted in the slot 128. The data communication channel 130 (using the beam splitter 124) may transfer the light beams 146b and 148 to the camera 168. The camera 168, from the light beams 146b, captures user images 106. Likewise, the camera 168, from the light beams 148, captures authentication media images 108. The camera 168 communicates the combination of user images 106 and authentication media images 108 to the scanner module 134 for performing multi-factor authentication operations by verifying the identity of the user 102 and the authentication media item 160, similar to that described above.

In an alternative embodiment, the system 100 may be configured to perform the authentication operation using the authentication media images 108 and user images 106 in series. For example, the system 100 may first perform the authentication operation based on the authentication media item 160, and the authentication operation based on user images 106 second, or vise versa.

Although, in FIG. 1, multi-factor authentication operations, including 1) an authentication operation based verifying the pin number 104, 2) an authentication operation based on verifying the authentication media item 160, 3) an authentication operation based on verifying the identity of the user 102 based on processing user images 108, and 4) an authentication operation based on verifying user data 170 are performed in the ATM terminal 120 by the processor 132, one of ordinary skill in the art would appreciate other embodiments. For example, any combination of the authentication operations enumerated above may be performed at the server 150 by the processor 152. For example, one or more of the pin number 104 (provided by the user 102 at the ATM terminal 120), authentication media images 108, and user images 106, may be sent to the server 150 for processing. As such, any combination of the authentication operations described in FIG. 1 may be carried out by processor 152 and/or processor 132.

In one embodiment, the system 100 may assign a score value (e.g., 0 or 1) to each of the authentication operations enumerated above, where the score value may represent whether the authentication operation is successful or not. The system 100 may verify the user 102, and conduct the transaction request 140 if a sum of score values is above a threshold value (e.g., 3 out of 4).

In an alternative embodiment, the system 100 may assign a weighted score value (e.g., a score value times a weight value from 1 to 10) to each of the authentication operations enumerated above, where a weight value may represent a priority of an authentication operation. For example, the system 100 may assign a higher weight value (e.g., 8 out of 10) to the authentication operation based on verifying the authentication media item 160, and assign a low weight value (e.g., 3 out of 10) to the authentication operation based on verifying the user data 170. The system 100 may verify the user 102, and conduct the transaction request 140 if a sum of weighted score values is above a threshold value (e.g., 30 out of 40).

Figure 2:
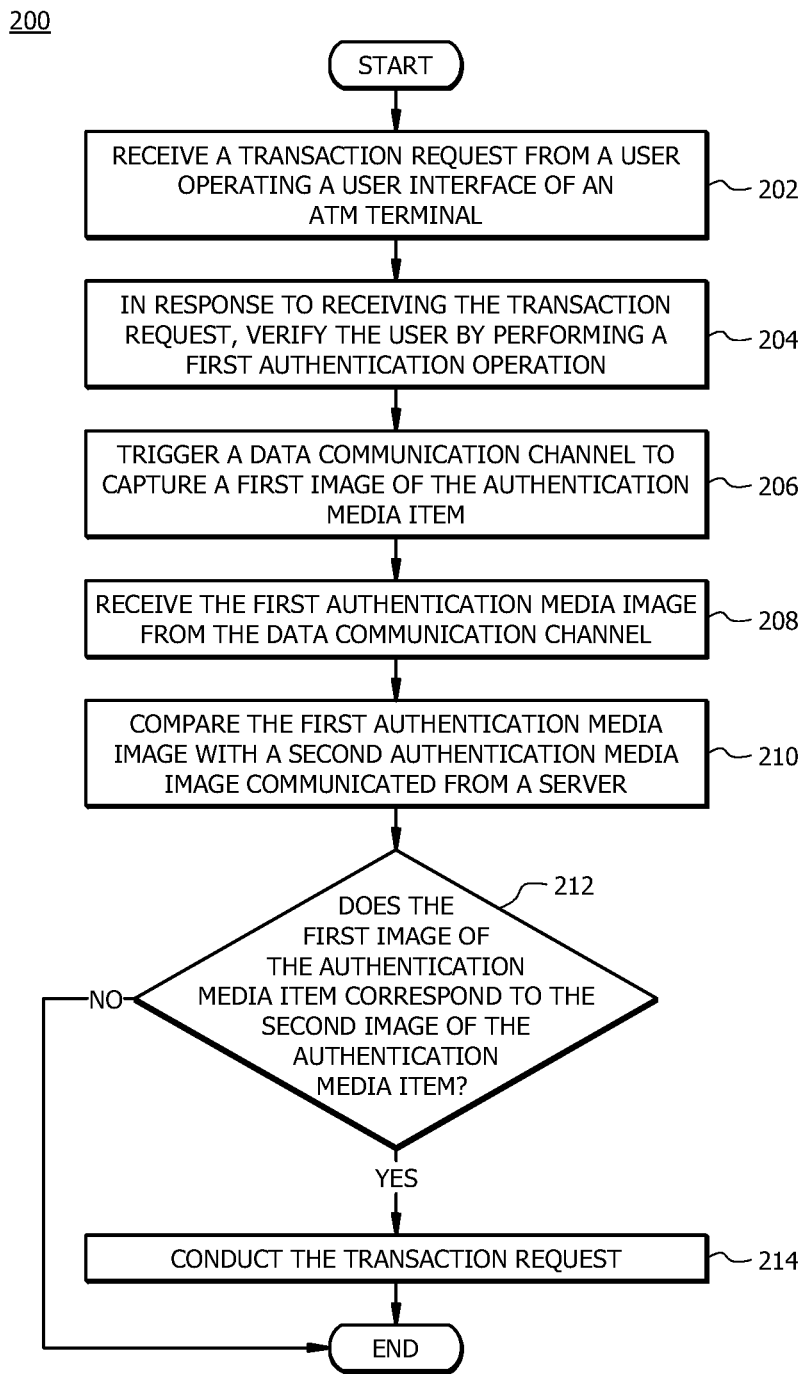
FIG. 2 illustrates an example flowchart of a method, at an ATM terminal, for implementing multi-factor authentication for authenticating a user at the ATM terminal using an authentication media item.

Example Method, at an ATM, for Implementing Multi-Factor Authentication for Verifying a User FIG. 2 illustrates an example flowchart of a method 200 for implementing multi-factor authentication for verifying a user 102 at an ATM terminal 120. Modifications, additions, or omissions may be made to method 200. Method 200 may include more, fewer, or other steps. For example, steps may be performed in parallel or any suitable order. While at times discussed as the system 100, ATM terminal 120, processor 132, server 150, processor 152, or components of any of thereof performing steps, any suitable system or components of the system may perform one or more steps of the method 200. For example, on or more steps of method 200 may be implemented, at least in part, in the form of software instructions 138 and 164 of FIG. 1, stored on non-transitory, tangible, machine-readable media (e.g., memories 136 and 158 of FIG. 1) that when run by one or more processors (e.g., processors 132 and 152 of FIG. 1) may cause the one or more processors to perform steps 202-214.

Method 200 begins at step 202 when the ATM terminal 120 receives a transaction request 140 from a user 102 operating a user interface 122 of the ATM terminal 120. The transaction request 140 may include at least one of withdrawing cash, checking a balance, making a deposit, or any other service that the ATM terminal 120 provides. For example, the ATM terminal 120 may receive the transaction request 140 from the user 102 when the user 102 inserts their magnetically encoded card, check, etc., into a slot at the ATM terminal 120. The user 102 then enters a pin number 104 associated with their account using the user interface 122. The processor 132 determines whether the pin number 104 corresponds to the pin number 167 associated with the account and user profile 166 of the user 102, similar to that described in FIG. 1. For example, assume that the processor 132 determines that the pin number 104 corresponds to the pin number 167.

At step 204, the processor 132 performs a first authentication operation to verify the user 102 using an authentication media item 160, in response to receiving the transaction request 140. For example, the processor 132 may perform the first authentication operation by implementing the software instructions 138 to execute the scanner module 134. Steps of the first authentication operation are described in steps 206 to 214 of method 200.

At step 206, the processor 132 triggers the data communication channel 130 to capture a first authentication media image 108. For example, the processor 132 may communicate a triggering signal to the data communication channel 130 to direct light beams 148 reflected from the authentication media item 160 inserted into the slot 128 to the camera 168. From the light beams 148, the camera 168 captures the first authentication media image 108. In another example, the processor 132 may communicate a triggering signal to the data communication channel 130 to focus the light beams 148 received by the beam splitter 124b to a spot where the scanner module 134 scans images, using a periscope camera, similar to that described in FIG. 1.

At step 208, the processor 132 receives the first authentication media image 108 from the data communication channel 130, similar to that described in FIG. 1.

At step 210, the scanner module 134 compares the first authentication media image 108 with a second authentication media image 114 communicated from the server 150. For example, the scanner module 134 (or the processor 132) may fetch the second authentication media image 114 of the authentication media item 160 from the user profile 166 associated with the user 102.

At step 212, the scanner module 134 determines whether the first authentication media image 108 corresponds to the second authentication media image 114. In this process, the scanner module 134 scans the first authentication media image 108, and extracts a unique code 162a that is embedded in the first authentication media image 108. The scanner module 134 also scans the second authentication media image 114, and extracts a unique code 162b that is embedded in the second authentication media image 114. The scanner module 134 determines whether the unique code 162a corresponds to the unique code 162b, similar to that described above in FIG. 1. The scanner module 134 determines that the first authentication media image 108 corresponds to the second authentication media image 114, if the unique code 162a corresponds to the unique code 162b. if it is determined that the unique code 162a corresponds to the unique code 162b, method 200 proceeds to step 214. Otherwise, method 200 may terminate.

At step 214, the processor 132 conducts the transaction request 140. In other words, the processor 132 fulfills the transaction request 140.

Although method 200 describes verifying the user 102 by performing the first authentication operation in which the authentication media item 160 is used, method 200 may include other authentication operations, similar to those described in FIG. 1. For example, method 200 may include performing a second authentication operation in which the identity of the user 102 is verified by capturing a first user image 106, extracting features 118a from the first user image 106, and comparing the features 118a with features 118b extracted from a second user image 116 communicated from the server 150, similar to that described in FIG. 1. In another example, method 200 may include performing a third authentication operation based on verifying the user data 170, including the timestamp of the transaction request 140, the location coordinate of the ATM terminal 120 that the user 102 is interacting with, etc., similar to that described in FIG. 1.

Furthermore, although, method 200 describes performing multi-factor authentication for verifying the user 102 via the processor 132, one of ordinary skill in the art would recognize other embodiments in light of the present disclosure. For example, in one embodiment, one or more authentication operations from the multi-factor authentication described in FIG. 1 may be performed at the server 150 via the processor 152. For example, the processor 152 may execute the software instructions 164 that includes code to perform various authentication operations described in FIG. 1, including 1) verifying the user 102 using an authentication media item 160; 2) verifying the user 102 using user images 106 and 116; 3) verifying the user 102 using the user profile 166; and 4) verifying the user 102 using historical transaction requests 140. In another example, the scanner module 134 may be implemented by the processor 152 executing software instructions 164 to perform various authentication operations described in FIG. 1. These operations are described below in methods 300 and 400.

Figure 3:
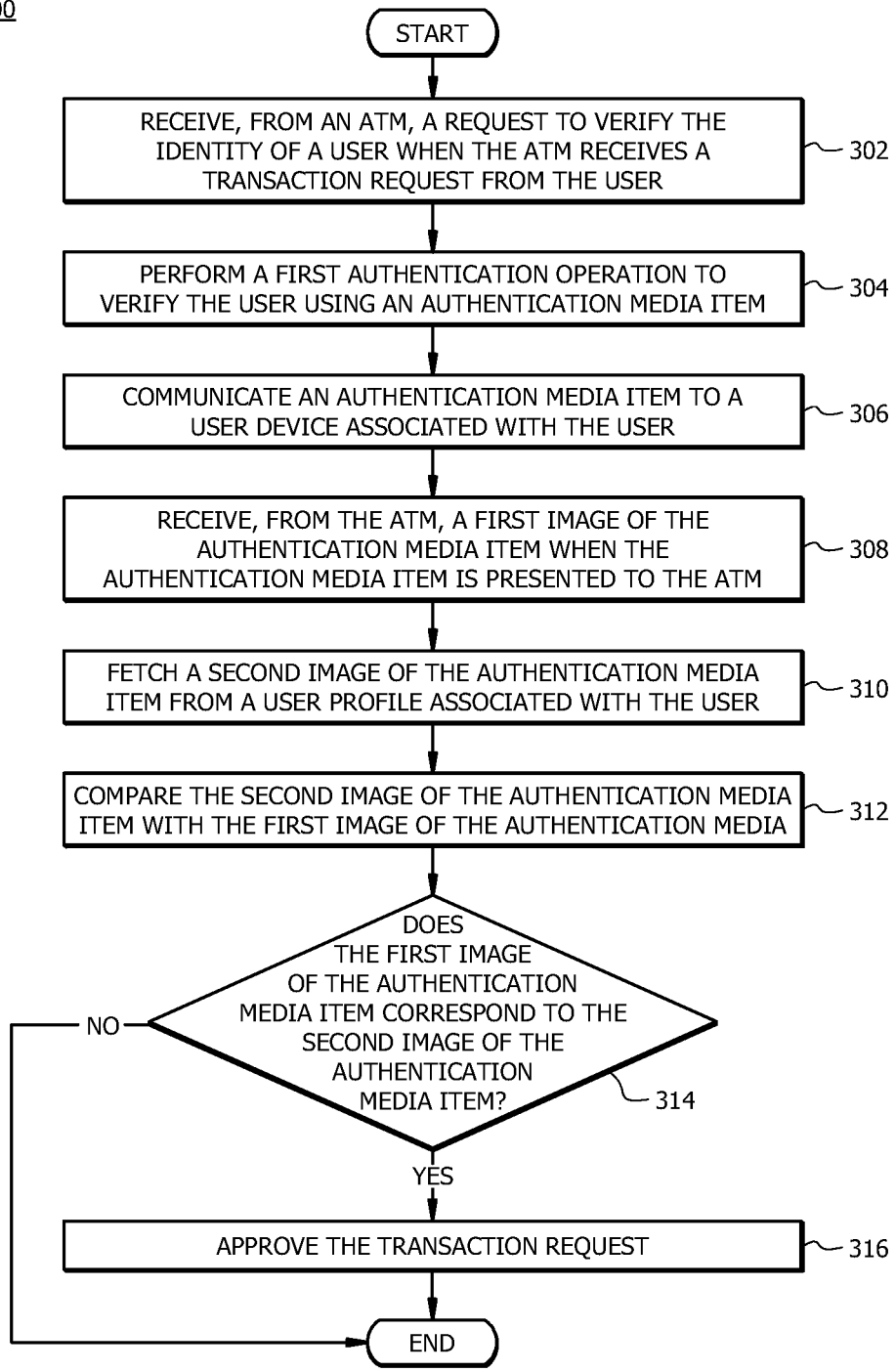
FIG. 3 illustrates an example flowchart of a method, at a server, for implementing multi-factor authentication for authenticating users at ATM terminals using an authentication media item.

Example Method, at a Server, for Verifying a User Operating an ATM using an Authentication Media Item FIG. 3 illustrates an example flowchart of a method 300 for implementing multi-factor authentication for verifying a user 102 operating an ATM terminal 120 using an authentication media item 160 from the server 150. Modifications, additions, or omissions may be made to method 300. Method 300 may include more, fewer, or other steps. For example, steps may be performed in parallel or any suitable order. While at times discussed as the system 100, ATM terminal 120, processor 132, server 150, processor 152, or components of any of thereof performing steps, any suitable system or components of the system may perform one or more steps of the method 300. For example, on or more steps of method 300 may be implemented, at least in part, in the form of software instructions 138 and 164 of FIG. 1, stored on non-transitory, tangible, machine-readable media (e.g., memories 136 and 158 of FIG. 1) that when run by one or more processors (e.g., processors 132 and 152 of FIG. 1) may cause the one or more processors to perform steps 302-316.

Method 300 begins at step 302 when the server 150 receives, from the ATM 120, a request to verify the identity of a user 102 when the ATM 120 receives a transaction request 140 from the user 102. For example, the transaction request 140 may include at least one of withdrawing cash, checking a balance, making a deposit, or any other service that the ATM terminal 120 provides. For example, the ATM 120 may send the request to the server 150 in response to the user 102 inserting a magnetically encoded card, a check, etc., into a slot at the ATM terminal 120. In another example, the ATM 120 may send the request to the server 150 in response to receiving a pin number 104 associated with a user account from the user 102, similar to that described in FIG. 1.

At step 304, the processor 152 performs a first authentication operation to verify the user 102 using an authentication media item 160. As discussed above in FIG. 1, the authentication of the user 102 may be executed by the server 150. Thus, the scanner module 134 may be implemented by the processor 152 executing software instructions 164. Steps of the first authentication operation are described in steps 306 to 316 of method 300.

At step, 306, the processor 152 communicates the authentication media item 160 to a user device 112 associated with the user 102. For example, the authentication media item 160 may be presented in a two-dimensional coded image, a barcode, a QR code, and the like.

At step 308, the processor 152 receives, from the ATM 120, a first image of the authentication medina item 108 when the authentication media item 160 is presented to the ATM 120. For example, the processor 152 may receive the first image of the authentication media item 108 from the ATM 120 when the user 102 inserts the user device 112 into the slot 128, similar to that described in FIG. 1. The first image of the authentication media item 108 may be embedded with a unique code 162a, similar to that describe above in FIG. 1.

At step 310, the processor 152 fetches a second image of the authentication media item 114 from the user profile 166 associated with the user 102 stored in the memory 158. The second image of the authentication media item 114 may be embedded with a unique code 162b, similar to that describe above in FIG. 1.

At step 312, the processor 152 compares the second image of the authentication media item 114 with the first image of the authentication media item 108.

At step 314, the processor 152 determines whether the first image of the authentication media item 108 corresponds to the second image of the authentication media item 114. In this process, the processor 152 (e.g., via the scanner module 134) scans the first image of the authentication media item 108, and extracts the unique code 162a from the first image of the authentication media item 108. Similarly, the processor 152 (e.g., via the scanner module 134) scans the second image of the authentication media item 114, and extracts the unique code 162b from the second image of the authentication media item 114. The processor 152 compares the unique code 162a with the unique code 162b. The processor 152 determines whether the unique code 162a corresponds to the unique code 162b, similar to that described above in FIG. 1 and step 210 of method 200 in FIG. 2. The processor 152 (e.g., via the scanner module 134) determines that the first authentication media image 108 corresponds to the second authentication media image 114, if the unique code 162a corresponds to the unique code 162b. If it is determined that the first image of the authentication media item 108 corresponds to the second image of the authentication media item 114 (i.e., the unique code 162a corresponds to the unique code 162b), method 300 proceeds to step 316. Otherwise, method 300 may terminate.

At step 314, the processor 152 approves the transaction request 140. For example, the processor 152 may send a message to the ATM 120 indicating that the first image of the authentication media item 108 corresponds to the second image of the authentication media item 114.

In one embodiment, the processor 152 may implement other authentication operations, such as using user images 106 and 116, historical transaction requests 140, similar to that described in FIGS. 1 and 2. For example, the processor 152 may implement one or more authentication operations described in FIG. 1, instead of in addition to verifying the user 102 based on verifying the authentication media item 160.

Figure 4:
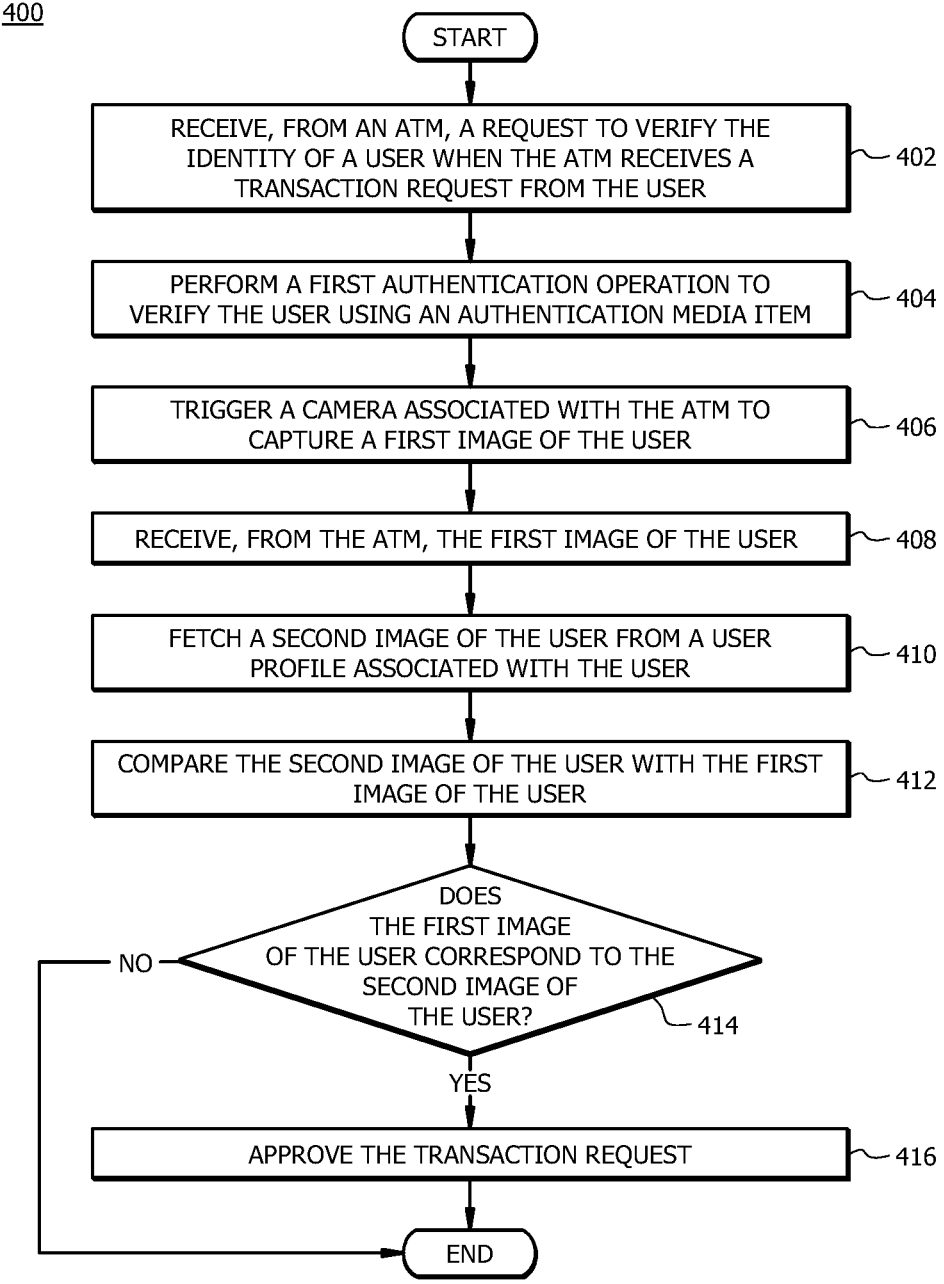
FIG. 4 illustrates an example flowchart of a method, at a server, for implementing multi-factor authentication for authenticating users at ATM terminals using user images.

Example Method, at a Server, for Verifying a User Operating an ATM using User Images FIG. 4 illustrates an example flowchart of a method 400 for implementing multi-factor authentication for verifying a user 102 operating an ATM terminal 120 using user images 105 and 116 from the server 150. Modifications, additions, or omissions may be made to method 400. Method 400 may include more, fewer, or other steps. For example, steps may be performed in parallel or any suitable order. While at times discussed as the system 100, ATM terminal 120, processor 132, server 150, processor 152, or components of any of thereof performing steps, any suitable system or components of the system may perform one or more steps of the method 400. For example, on or more steps of method 400 may be implemented, at least in part, in the form of software instructions 138 and 164 of FIG. 1, stored on non-transitory, tangible, machine-readable media (e.g., memories 136 and 158 of FIG. 1) that when run by one or more processors (e.g., processors 132 and 152 of FIG. 1) may cause the one or more processors to perform steps 402-416.

Method 400 begins at step 402 when the server 150 receives, from the ATM 120, a request to verify the user 102 when the ATM 120 receives a transaction request 140 from the user 102. For example, the transaction request 140 may include at least one of withdrawing cash, checking a balance, making a deposit, or any other service that the ATM terminal 120 provides. For example, the ATM 120 may send the request to the server 150 in response to the user 102 inserting a magnetically encoded card, a check, etc., into a slot at the ATM terminal 120. In another example, the ATM 120 may send the request to the server 150 in response to receiving a pin number 104 associated with a user account from the user 102, similar to that described in FIG. 1.

At step 404, the processor 152 performs a first authentication operation to verify the user 102 using user images 106 and 116. As discussed above, the authentication process may be executed by the server 150. Thus, the scanner module 134 may be implemented by the processor 152 executing software instructions 164. Steps of the first authentication operation are described in steps 406 to 416 of method 400.

At step 406, the processor 152 triggers the camera 126 (or camera 168) associated with the ATM 120 to capture a first user image 106. For example, the processor 152 may trigger the camera 126 (or camera 168) to capture the first user image 106, by sending a triggering instruction to the camera 126 (or camera 168) via the network 110.

At step 408, the processor 152 receives, from the ATM 120, the first user image 106. For example, the processor 152 may receive the first user image 106 from the ATM 120 via the beam splitters 124a and 124b, and data communication channel 130, similar to that described above in FIG. 1.

At step 410, the processor 152 fetches a second user image 116 from the user profile 166 associated with the user 102.

At step 412, the processor 152 compares the second user image 116 with the first user image 106.

At step 414, the processor 152 determines whether the first user image 106 corresponds to the second user image 116. In this process, the processor 152, by executing software instructions 164, extracts a first set of features 118a from the first user image 106, where the first set of features 118a may include biometric features of the user, such as facial features, etc. The first set of features 118a may be represented by a first vector comprising a first set of numerical values. Similarly, the processor 152 extracts a second set of features 118b from the second user image 116. The second set of features 118b may be represented by a second vector comprising a second set of numerical values. The processor 152 may compare each numerical value from the first set of numerical values (representing the first set of features 118a) with its corresponding numerical value from the second set of numerical values (representing the second set of features 118b). The processor 152 may determine whether more than a threshold percentage (e.g., 80%, 85%, etc.) of the first set of numerical values representing features 118a are within a threshold range (e.g., ±5%, ±10%, etc.) from their corresponding numerical values of the second set of numerical values representing features 118b. In response to determining that more than the threshold percentage of the first set of numerical values representing features 118a are within the threshold range from their corresponding numerical values of the second set of numerical values representing features 118b, the processor 152 determines that the first user image 106 corresponds to the second user image 116. If it is determined that the first user image 106 corresponds to the second user image 116, method 400 proceeds to step 416. Otherwise, method 400 may terminate.

At step 416, the processor 152 approves the transaction request 140. For example, the processor 152 may send a message to the ATM 120 indicating that the first image of the authentication media item 108 corresponds to the second image of the authentication media item 114.

In one embodiment, the processor 152 may implement other authentication operations, such as using an authentication media item 160, historical transaction requests 140, similar to that described in FIGS. 1-3. For example, the processor 152 may implement one or more authentication operations described in FIG. 1, instead of in addition to verifying the user 102 using user images 106 and 116.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements 118 or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An automated teller machine (ATM), comprising:
a memory operable to store a first image of an authentication media item associated with a user, wherein:
the authentication media item comprises at least one of a barcode and a Quick Response (QR) code;
the authentication media item is associated with a unique code; and
the unique code is a unique identifier used for authenticating the user;
a camera, operably coupled with the memory, and configured to capture a second image of the authentication media item when the authentication media item is presented to the ATM;
a processor, operably coupled with the camera and the memory, and configured to:
receive a transaction request;
in response to receiving the transaction request, verify the user by performing a multi-factor authentication comprising at least a first authentication operation and a second authentication operation, wherein performing the first authentication operation comprises:
triggering the camera to capture the second image of the authentication media item;
receiving the second image of the authentication media item from the camera;
comparing the first image of the authentication media item with the second image of the authentication media item, comprising:
extracting a first unique code embedded in the first image of the authentication media item;
extracting a second unique code embedded in the second image of the authentication media item;
comparing the first unique code with the second unique code; and
determining whether the first unique code corresponds to the second unique code;
determining whether the first image of the authentication media item corresponds to the second image of the authentication media item; and wherein the second authentication operation comprises:
accessing historical transaction requests associated with the user, wherein the historical transaction requests comprise a time range of the historical transaction requests;
identifying a first timestamp associated with the transaction request; and
determining whether the first timestamp is within the time range of the historical transaction requests; and
in response to determining that the first image of the authentication media item corresponds to the second image of the authentication media item and that the first time stamp is within the time range of the historical transaction requests, conducting the transaction request.

2. The automated teller machine of claim 1, wherein:
the memory is further operable to store a first image of the user; and
the processor is further configured to verify the user by performing a second authentication operation, comprising:
fetching the first image of the user from the memory;
extracting a first set of features from the first image of the user, wherein the first set of features comprises biometric features of the user;
triggering the camera to capture a second image of the user;
receiving the second image of the user from the camera;
extracting a second set of features from the second image of the user;
comparing the first set of features with the second set of features;
determining whether the first set of features corresponds to the second set of features; and
in response to determining that the first set of features corresponds to the second set of features, conducting the transaction request.

3. The automated teller machine of claim 2, wherein the second authentication operation further comprises, in response to determining that the first image of the user does not correspond to the second image of the user, denying the transaction request.

4. The automated teller machine of claim 1, further comprises a beam splitter, operably coupled with the camera, the beam splitter comprises an optical device that is configured to:
capture beams of light reflected from the authentication media item when the authentication media item is inserted into a dedicated slot of the ATM; and
divert the captured beams of light to the camera.

5. The automated teller machine of claim 4, wherein the beam splitter is positioned at an angle with respect to the camera such that the camera is enabled to capture:
the second image of the authentication media item when the authentication media item is presented to the ATM even though the authentication media item is not within a field of view of the camera; and
the second image of the user.

6. The automated teller machine of claim 2, wherein the processor is further configured to:
determine whether the first authentication operation has failed; and
in response to determining that the first authentication operation has failed, perform the second authentication operation.

7. A method for verifying a user at an automated teller machine (ATM), comprising:
receiving a transaction request from a user interface of the ATM;
in response to receiving the transaction request, verifying the user by performing a multi-factor authentication comprising at least a first authentication operation and a second authentication operation, performing the first authentication operation comprising:
fetching a first image of an authentication media item from a user profile associated with the user, wherein:
the authentication media item comprises at least one of a barcode and a Quick Response (QR) code;
the authentication media item is associated with a unique code; and
the unique code is a unique identifier used for authenticating the user;
triggering a camera of the ATM to capture a second image of the authentication media item when the authentication media item is presented to the ATM;
comparing the first image of the authentication media item with the second image of the authentication media item, comprising:
extracting a first unique code embedded in the first image of the authentication media item;
extracting a second unique code embedded in the second image of the authentication media item;
comparing the first unique code with the second unique code; and
determining whether the first unique code corresponds to the second unique code;
determining whether the first image of the authentication media item corresponds to the second image of the authentication media item; and
wherein the second authentication operation comprises:
accessing historical transaction requests associated with the user, wherein the historical transaction requests comprise a time range of the historical transaction requests;
identifying a first timestamp associated with the transaction request; and
determining whether the first timestamp is within the time range of the historical transaction requests; and
in response to determining that the first image of the authentication media item corresponds to the second image of the authentication media item and that the first time stamp is within the time range of the historical transaction requests, conducting the transaction request.

8. The method of claim 7, further comprising performing a second authentication operation, comprising:
fetching a first image of the user from the user profile;
extracting a first set of features from the first image of the user, wherein the first set of features comprises biometric features of the user;
triggering the camera to capture a second image of the user;
extracting a second set of features from the second image of the user;
determining whether the first set of features corresponds to the second set of features; and
in response to determining that the first set of features corresponds to the second set of features, conducting the transaction request.

9. The method of claim 7, further comprising:
capturing, by a beam splitter, beams of light reflected from the authentication media item when the authentication media item is inserted into a dedicated slot of the ATM; and
diverting the captured beams of light to the camera, wherein the beam splitter comprises an optical device.

10. The method of claim 9, wherein the beam splitter is positioned at an angle with respect to the camera such that the camera is enabled to capture:
the second image of the authentication media item when the authentication media item is presented to the ATM even though the authentication media item is not within a field of view of the camera; and
the second image of the user.

11. The method of claim 8, further comprising:
determining whether the first authentication operation has failed; and
in response to determining that the first authentication operation has failed, performing the second authentication operation.

12. A non-transitory computer-readable medium storing software instructions that when executed by a processor cause the processor to:
receive a transaction request from a user interface of an automated teller machine (ATM);
in response to receiving the transaction request, verify a user by performing a multi-factor authentication comprising at least a first authentication operation and a second authentication operation, comprising:
fetching a first image of an authentication media item from a memory, wherein:
the authentication media item comprises at least one of a barcode and a Quick Response (QR) code;
the authentication media item is associated with a unique code; and
the unique code is a unique identifier used for authenticating the user;
triggering a camera of the ATM to capture a second image of the authentication media item when the authentication media item is presented to the ATM;
comparing the first image of the authentication media item with the second image of the authentication media item, comprising:
extracting a first unique code embedded in the first image of the authentication media item;
extracting a second unique code embedded in the second image of the authentication media item;
comparing the first unique code with the second unique code; and
determining whether the first unique code corresponds to the second unique code;
determining whether the first image of the authentication media item corresponds to the second image of the authentication media item; and
wherein the second authentication operation comprises:
accessing historical transaction requests associated with the user, wherein the historical transaction requests comprise a time range of the historical transaction requests;
identifying a first timestamp associated with the transaction request; and
determining whether the first timestamp is within the time range of the historical transaction requests; and
in response to determining that the first image of the authentication media item corresponds to the second image of the authentication media item and that the first time stamp is within the time range of the historical transaction requests, conducting the transaction request.

13. The non-transitory computer-readable medium of claim 12, wherein the instructions when executed by the processor, further cause the processor to verify the user by performing a second authentication operation, comprising:
    fetching the first image of the user from the memory;
    extracting a first set of features from the first image of the user, wherein the first set of features comprises biometric features of the user;
    triggering the camera to capture a second image of the user;
    receiving the second image of the user from the camera;
    extracting a second set of features from the second image of the user;
    comparing the first set of features with the second set of features;
    determining whether the first set of features corresponds to the second set of features; and
    in response to determining that the first set of features corresponds to the second set of features, conducting the transaction request.

14. The non-transitory computer-readable medium of claim 13, wherein the second authentication operation further comprises, in response to determining that the first image of the user does not correspond to the second image of the user, denying the transaction request.

15. The non-transitory computer-readable medium of claim 12, wherein the instructions when executed by the processor, further cause the processor to:
    capture, by a beam splitter, beams of light reflected from the authentication media item when the authentication media item is inserted into a dedicated slot of the ATM; and
    divert the captured beams of light to the camera, wherein the beam splitter comprises an optical device.

16. The non-transitory computer-readable medium of claim 15, wherein:
    the beam splitter is positioned at an angle with respect to the camera such that the camera is enabled to capture:
    the second image of the authentication media item when the authentication media item is presented to the ATM even though the authentication media item is not within a field of view of the camera; and
    the second image of the user.

17. The non-transitory computer-readable medium of claim 14, wherein the instructions when executed by the processor, further cause the processor to:
    determine whether the first authentication operation has failed; and
    in response to determining that the first authentication operation has failed, perform the second authentication operation.

* * * * *